US011890860B2

(12) United States Patent
Noda et al.

(10) Patent No.: US 11,890,860 B2
(45) Date of Patent: Feb. 6, 2024

(54) PRINTING APPARATUS

(71) Applicant: BROTHER KOGYO KABUSHIKI KAISHA, Nagoya (JP)

(72) Inventors: Masahiro Noda, Ogaki (JP); Atsushi Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/864,952

(22) Filed: Jul. 14, 2022

(65) Prior Publication Data

US 2023/0082316 A1 Mar. 16, 2023

(30) Foreign Application Priority Data

Sep. 16, 2021 (JP) ................................ 2021-150964

(51) Int. Cl.
*B41J 11/00* (2006.01)

(52) U.S. Cl.
CPC ............................... *B41J 11/00214* (2021.01)

(58) Field of Classification Search
CPC ....................... B41J 11/00214; B41J 11/00218
See application file for complete search history.

(56) References Cited

U.S. PATENT DOCUMENTS

2014/0240418 A1* 8/2014 Masuda ............... B41J 11/0022 347/102

FOREIGN PATENT DOCUMENTS

JP 2014-011195 A 1/2014
JP 2015-193089 A 11/2015

* cited by examiner

*Primary Examiner* — Bradley W Thies
(74) *Attorney, Agent, or Firm* — Baker Botts L.L.P.

(57) ABSTRACT

A printing apparatus, including a discharging head, a relative movable assembly to move a printable medium and the discharging head relatively, and a lighting unit including a plurality of light sources to emit light for curing the ink, is provided. A part of the plurality of light sources is arranged in a first lighting area, and another part of the plurality of light sources is arranged in a second lighting area. A quantity of the light sources per unit area in the second lighting area is smaller than a quantity of the light sources per unit area in the first lighting area. A direct distance from the discharging head to the second lighting area in a direction parallel to the predetermined direction is shorter than a direct distance from the discharging head to the first lighting area.

6 Claims, 7 Drawing Sheets

PRINTING APPARATUS

CROSS REFERENCE TO RELATED APPLICATION

This application claims priority under 35 U.S.C. § 119 from Japanese Patent Application No. 2021-150964, filed on Sep. 16, 2021, the entire subject matter of which is incorporated herein by reference.

BACKGROUND

The present disclosure is related to a printing apparatus having a discharging head, which may discharge ultraviolet-curable ink at a printable medium, and a lighting unit, which has light sources to cure the ink.

A lighting unit having a plurality of light sources, e.g., LEDs, which may emit ultraviolet (UV) light at UV-curable ink discharged from a discharging head on a printable medium, is known. The discharging head and the lighting unit may be arranged side by side on a carriage along a main scanning direction, By emitting the UV light at the ink droplets landed on the printable medium, the ink may be cured and fixed on the printable medium.

SUMMARY

Meanwhile, the UV light emitted from the lighting unit may occasionally reflect off a surface of a platen or a surface of the recordable medium, and a nozzle surface of the discharging head may be irradiated with the reflected light. As a result, the ink inside the nozzles may be cured by the reflected light and may not be discharged correctly through the nozzles. In order to prevent the incorrect discharging of the ink from the discharging head, for example, one may consider reducing illuminance of the light from the lighting unit. However, the reduced illuminance may not cure the ink substantially. For another example, one may consider increasing a distance between the discharging head and the lighting unit so that the reflected light may not be directed to the nozzle surface. However, increasing the distance between the discharging head and the lighting unit may increase a volume of the carriage.

The present disclosure is advantageous in that a printing apparatus, in which deficiency in discharging ink may be prevented while curability of ink is secured, without increasing a volume of a carriage, is provided.

According to an aspect of the present disclosure, a printing apparatus, including a discharging head configured to discharge ultraviolet-curable ink at a printable medium, a relative movable assembly configured to move the printable medium and the discharging head relatively in a predetermined direction when the discharging head discharges the ink at the printable medium, and a lighting unit including a plurality of light sources configured to emit light for curing the ink, is provided. The plurality of light sources includes a part of the plurality of light sources and another part of the plurality of light sources. The part of the plurality of light sources is arranged in a first lighting area, and the another part of the plurality of light sources is arranged in a second lighting area. A quantity of the light sources per unit area in the second lighting area is smaller than a quantity of the light sources per unit area in the first lighting area. A direct distance from the discharging head to the second lighting area in a direction parallel to the predetermined direction is shorter than a direct distance from the discharging head to the first lighting area in the direction parallel to the predetermined direction.

DETAILED DESCRIPTION

In the following paragraphs, with reference to the accompanying drawings, embodiments of the present disclosure will be described. It is noted that a printing apparatus described below is merely embodiments of the present disclosure, and various connections may be set forth between elements in the following description. These connections in general and, unless specified otherwise, may be direct or indirect and that this specification is not intended to be limiting in this respect.

First Embodiment

Figure 1:
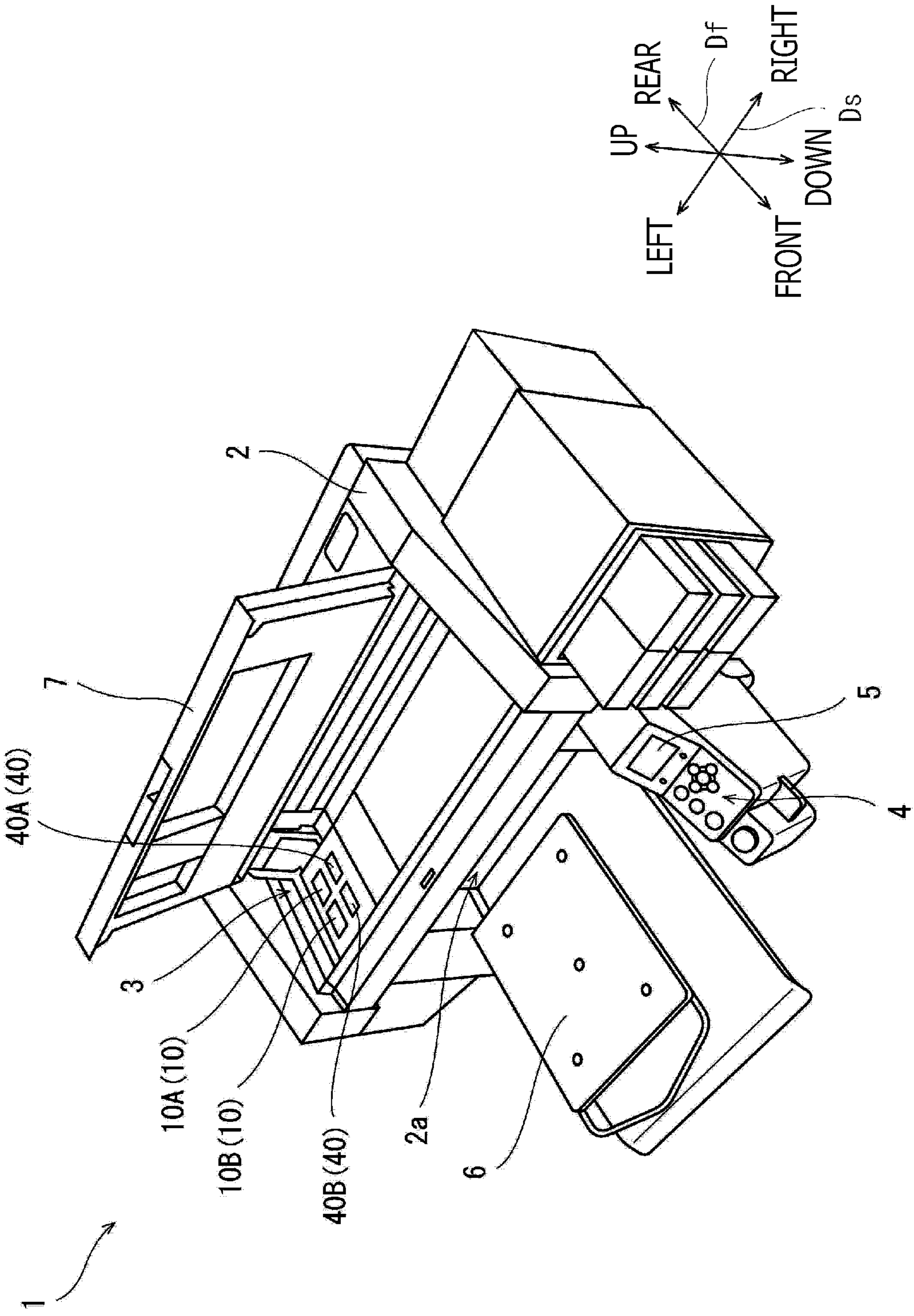
FIG. 1 is a perspective view of a printing apparatus according to a first embodiment of the present disclosure.
Figure 2:
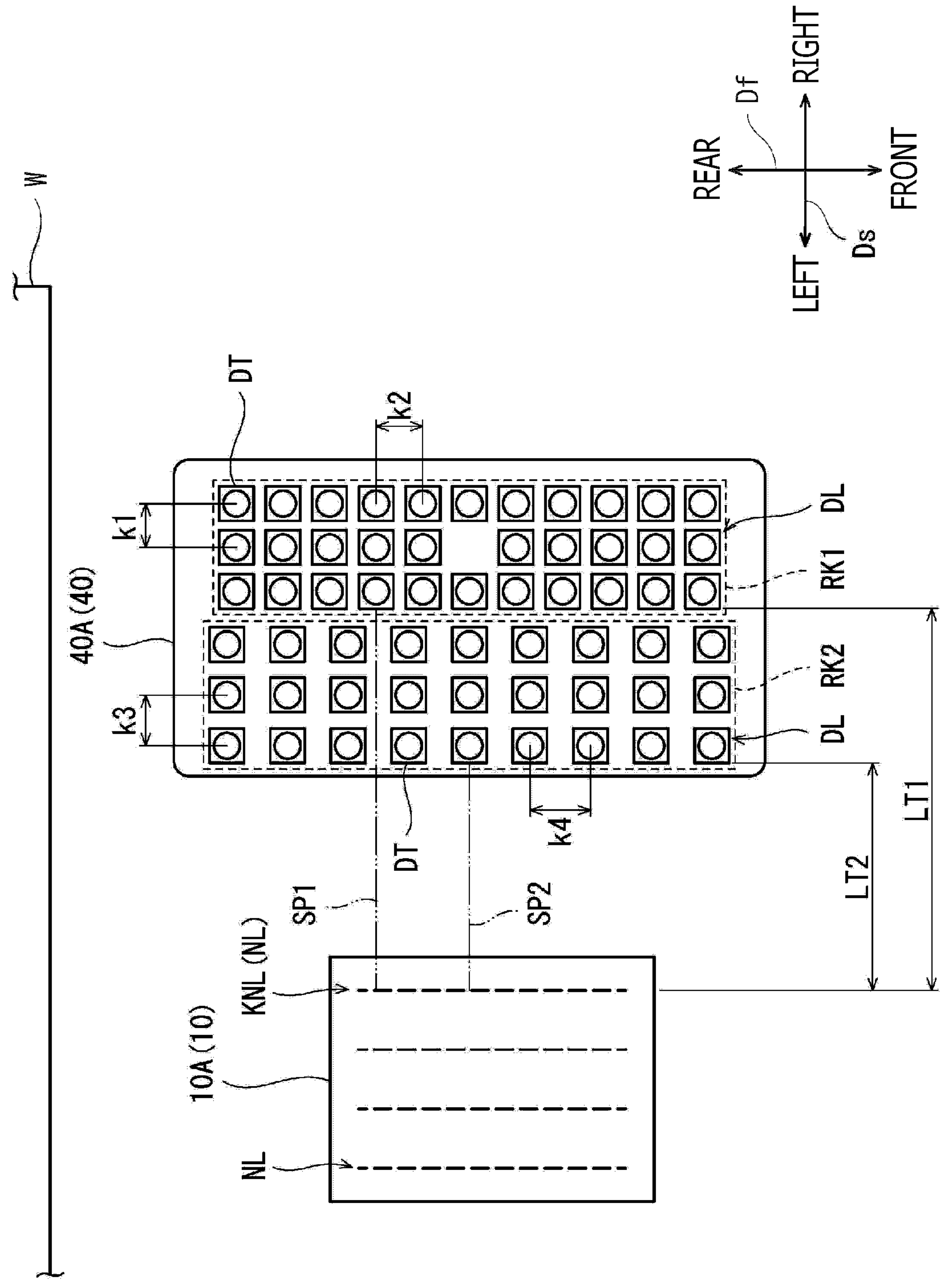
FIG. 2 is an illustrative view of a discharging head and a lighting unit mounted on a carriage of the printing apparatus according to the first embodiment of the present disclosure.

FIG. 1 is a perspective view of a printing apparatus 1 according to the first embodiment of the present disclosure. FIG. 2 is an illustrative view of a discharging head 10 and a lighting unit 40 mounted on a carriage 3 of the printing apparatus 1 according to the first embodiment of the present disclosure. In the following description, directions in three (3) dimensions intersecting orthogonally to one another may be called as a vertical direction, a widthwise direction, and a front-rear direction, as indicated by bidirectionally pointing allows shown in FIG. 1. The widthwise direction may also be called as a main scanning direction Ds, and the front-rear direction may also be called as a sub-scanning direction Df. The printing apparatus 1 may print images not only on printable media W such as sheets but also on printable media W being goods, such as resin products.

Figure 3:
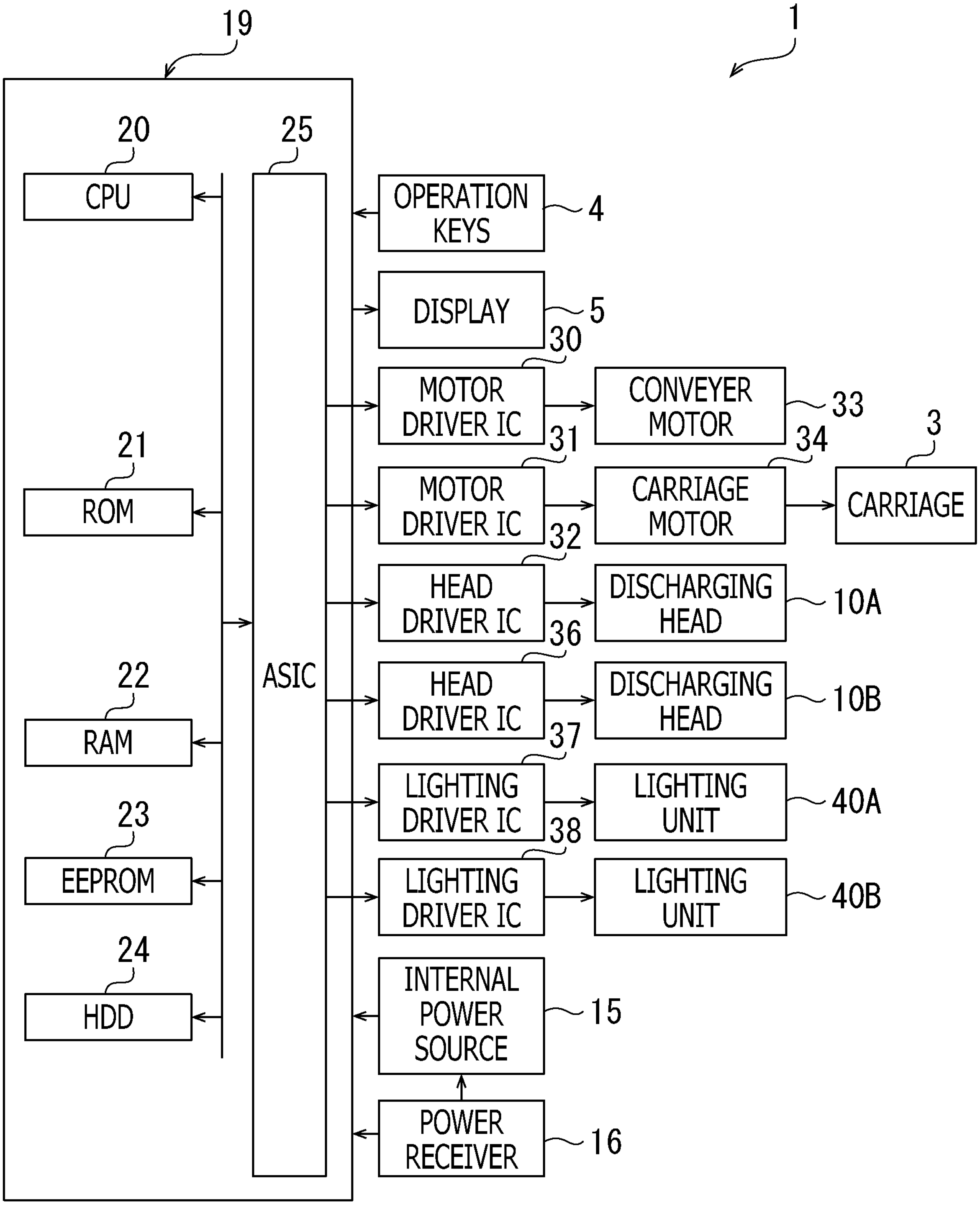
FIG. 3 is a block diagram to illustrate a configuration of the printing apparatus according to the first embodiment of the present disclosure.

As shown in FIG. 1, the printing apparatus 1 in the present embodiment has a housing 2, the carriage 3, operation keys 4, a display 5, a platen 6, and an upper cover 7. Moreover, the printing apparatus 1 has a controller unit 19 (see FIG. 3), which will be described further below.

The housing 2 may have a form of a box. The housing 2 has an opening 2*a* on a front side thereof and an opening, which is not shown, on a rear side thereof. At rightward-front positions of the housing 2, the operation keys 4 are arranged. At a rearward position with respect to the operation keys 4, the display 5 is arranged. The operation keys 4 may accept operations input by a user. The display 5 may include, for example, a touch panel and may display predetermined types of information. A part of the display 5 may work as an operation key at a predetermined timing. The controller unit 19 may, based on input through the operation keys 4 or external input through a communication interface, which is not shown, perform printing and control the display 5 to display the information.

The carriage 3 may move the printable medium W and the discharging head 10, which will be described further below, relatively in the main scanning direction Ds when ink is discharged from the discharging head 10 at the printable medium W. In particular, the carriage 3 may reciprocate along the main scanning direction Ds, and the discharging head 10 may be moved in the main scanning direction Ds with respect to the printable medium W when the ink is discharged from the discharging head 10 at the printable medium W.

As shown in FIG. 1, on the carriage 3, the discharging head 10 and a lighting unit 40 are mounted. More specifically, the discharging head 10 including two (2) discharging heads 10A, 10B and the lighting unit 40 including two (2) lighting units 40A, 40B are mounted on the carriage 3. The discharging heads 10A, 10B may be, for example, inkjet heads that may discharge UV-curable inks. Each of the lighting units 40A, 40B includes a plurality of LED chips DT (see FIG. 2), which may emit UV light. The inks discharged from the discharging heads 10A, 10B and landing on the printable medium W may be cured by the UV light emitted from the LED chips DT in the lighting units 40A, 40B. The lighting unit 40A and the lighting unit 40B may be in an identical configuration.

According to the present embodiment, the discharging head 10A and the discharging head 10B are arranged side by side along the sub-scanning direction Df. The discharging head 10B may be located frontward with respect to the discharging head 10A. Meanwhile, the lighting unit 40A and the lighting unit 40B are arranged side by side along the sub-scanning direction Df. The lighting unit 40B may be located frontward with respect to the lighting unit 40A. Furthermore, the discharging head 10A and the lighting unit 40A are arranged side by side along the main scanning direction Ds. The lighting unit 40A may be located rightward with respect to the discharging head 10A. The discharging head 10B and the lighting unit 40B are arranged side by side along the main scanning direction Ds. The lighting unit 40B may be located rightward with respect to the discharging head 10B. It may be noted, however, that the arrangement of the discharging heads 10A, 10B and the lighting units 40A, 40B is merely an example and may not necessarily be limited to the arrangement described above.

The LED chips DT in the lighting unit 40A are in an arrangement such that a UV light-emitting range of the LED chips DT is greater than a dimension of nozzle lines NL in the sub-scanning direction Df. Therefore, the UV light may preferably reach to irradiate the ink droplets, including ink droplets discharged from one end, e.g., a frontward end, and the other end, e.g., a rearward end, of the nozzle lines NL in the sub-scanning direction Df.

In a single pass in a printing process, the carriage 3 may move leftward in the main scanning direction Ds. Thereby, the discharging head 10 and the lighting unit 40 may move leftward in the printing process. Meanwhile, the discharging head 10 moving leftward in the main scanning direction Ds may discharge the inks at the printable medium W, and the lighting unit 40 moving leftward in the main scanning direction Ds may irradiate the inks landed on the printable medium W with the UV light, Thus, with the lighting unit 40 located rearward with respect to the discharging head 10 in a moving direction of the carriage 3 moving in the printing process, the inks on the printing medium W may be irradiated with the UV light immediately after landing.

When the single pass in the printing process is completed, the carriage 3 may move rightward in the main scanning direction Ds and return to a predetermined position in the main scanning direction Ds. Thereby, the discharging head 10 and the lighting unit 40 may move rightward in the main scanning direction Ds. Meanwhile, the discharging head 10 may move rightward in the main scanning direction Ds without discharging the inks, but the lighting unit 40 may move rightward in the main scanning direction to emit UV light to irradiate the ink discharged in the completed single pass in the printing process. Thus, the inks may be irradiated by the UV light substantially, and curability of the ink may be improved.

In the present embodiment, the discharging head 10A may discharge inks in colors of yellow (Y), magenta (M), cyan (C), and black (K), which may be generally called as color inks, FIG. 2 illustrates the discharging head 10A, representing the discharging head 10, for discharging the color inks in the present embodiment. In the discharging head 10A, a plurality of nozzle lines NL are arranged side by side spaced from one another at equal intervals along the main scanning direction Ds. Each of the nozzle lines NL may discharge one of the four colored inks and longitudinally extends in the sub-scanning direction Df. The nozzle lines NL in the discharging head 10A may be, but not necessarily, arranged in an order from left to right: a nozzle line NL for discharging the yellow ink, a nozzle line NL for discharging the magenta ink, a nozzle line NL for discharging the cyan ink, and a nozzle line NL for discharging the black ink.

Meanwhile, the discharging head 10B may discharge a white (W) ink and a clear (Cr) ink. In the discharging head 10B, a plurality of nozzle lines NL are arranged side by side spaced from each other along the main scanning direction Ds. Each of the nozzle lines NL may discharge one of the white and clear inks and longitudinally extends in the sub-scanning direction Df. The interval between the nozzle lines NL may or may not be equal to the interval between the nozzle lines NL in the discharging head 10A. The nozzle lines NL in the discharging head 10B may be, but not necessarily, arranged in an order from left to right: a nozzle line NL for discharging the white ink and a nozzle line NL for discharging the clear ink.

Thus, a multicolored image may be printed on the printable medium W by discharging the inks in the six colors at the printable medium W. When, for example, a multicolored image is printed on a piece of fabric being the printable medium W, in order to reduce influence of a base color of the fabric on the image and influence by the color inks to the material of the fabric, the white ink may be discharged to form a base layer in advance, and the color inks may be discharged later on the white base. The clear ink may be discharged to apply glossy coating over the printed image or to protect the printed image.

The platen 6 is configured to place the printable medium W thereon. The platen 6 has a predetermined thickness and includes a rectangular plate elongated in, for example, the sub-scanning direction Df. The platen 6 is supported removably by a platen-supporting stand, which is not shown. The platen-supporting stand is movable between a printing position, at which an image may be printed on the printable medium W, and a removable position, at which the printable medium W may be removed from the platen 6. The printable position is a position, at which the platen 6 faces the discharging head 10, and the removable position is a position, at which the platen-supporting stand is located outside the housing 2 and at which the printable medium W may be set on the platen 6, While printing an image, the platen 6 moves in the sub-scanning direction Df; therefore, the printable medium W placed on the platen 6 may be conveyed in the sub-scanning direction Df.

The upper cover 7 is pivotable upward by being lifted at a frontward part thereof, By pivoting the upper cover 7 upward, a cavity inside the housing 2 may be exposed and may be accessed by a user for, for example, maintenance works.

As shown in FIG. 2, the lighting unit 40A has a first lighting area RK1 and a second lighting area RK2. The first lighting area RK and the second lighting area RK2 are arranged side by side along the main scanning direction Ds. In the following paragraphs, the lighting unit 40A and the discharging head 10A aligning side by side in the main scanning direction Ds will be described as representatives of the lighting unit 40 and the discharging head 10, respectively. In other words, the lighting unit 40B and the discharging head 10B aligning side by side in the main scanning direction Ds may be described substantially identically to the lighting unit 40A and the discharging head 10A, respectively.

The second lighting area RK2 is located leftward with respect to the first lighting area RK1. In particular, the second lighting area RK2 is in an arrangement such that a direct distance LT2, which is from the discharging head 10A to the second lighting area RK2, in a direction parallel to the main scanning direction Ds, is shorter than a direct distance LT1, which is from the discharging head 10A to the first lighting area RK1, in a direction parallel to the main scanning direction Ds.

In the present embodiment, more specifically, the direct distance LT2 is a distance from a closest nozzle line KNL in the discharging head 10A to a leftward end of the LED chips DT closest to the discharging head 10A among the LED chips DT in the second lighting area RK2 in the main scanning direction Ds. In the present embodiment, the direct distance LT2 is equal to a minimum distance from the closest nozzle line KNL to the leftward end of the LED chips DT in the second lighting area RK2 and is therefore relevant to a space SP2 between the closest nozzle line KNL and the leftward end of the LED chips DT in the second lighting area RK2. The closest nozzle line KNL is one of the nozzle lines NL in the discharging head 10A closest to the lighting unit 40A, which is, in the present embodiment, a most rightward nozzle line NL in the discharging head 10A. A distance between a rightward end of the discharging head 10A and the closest nozzle line KNL may be, for example, in a range from 50 to 200 mm. Meanwhile, the direct distance LT1 is a distance from the closest nozzle line KNL in the discharging head 10A to a leftward end of the LED chips DT closest to the discharging head 10A among the LED chips DT in the first lighting area RK1 in the main scanning direction Ds. In the present embodiment, the direct distance LT1 is equal to a minimum distance from the closest nozzle line KNL to the leftward end of the LED chips DT in the first lighting area RK1 and is therefore relevant to a space SP1 between the closest nozzle line KNL and the leftward end of the LED chips DT in the first lighting area RK1.

In each of the first lighting area RK1 and the second lighting area RK2 in the lighting unit 40A, a plurality of LED chips DT are arranged. The LED chips DT in the first lighting area RK1 and the LED chips DT in the second lighting area RK2 are arranged in matrixes. In particular, the LED chips DT are arranged along a direction parallel to the main scanning direction Ds and a direction parallel to the sub-scanning direction Df. In FIG. 2, a group of LED chips arranged along the sub-scanning direction Df at predetermined intervals is indicated as a chip line DL. Optionally, in order to restrain a temperature of the LED chips DT from increasing, a center of the first lighting area RK1 may be left blank without arranging the LED chip DT.

A quantity of LED chips DT per unit area in the second lighting area RK2 is smaller than a quantity of LED chips DT per unit area in the first lighting area RK1. In other words, the second lighting area RK2 is coarser than the first lighting area RK1 with regard to the quantity of LED chips DT, and the first lighting area RK1 is denser than the second lighting area RK2 with regard to the quantity of LED chips DT.

Intervals between the LED chips DT in the first lighting area RK1 and the second lighting area RK2 will be herein described. The LED chips DT in the first lighting area RK1 and the second lighting area RK2 are in an arrangement such that intervals between adjoining LED chips DT in the second lighting area RK2 in at least one of the main scanning direction Ds and the sub-scanning direction Df are longer than intervals between adjoining LED chips DT in the first lighting area RK1 in at least one of the main scanning direction Ds and the sub-scanning direction Df.

In particular, in the present embodiment, an interval between the LED chips DT adjoining in the main scanning direction Ds in the first lighting area RK1 is called as an interval k1, and an interval between the LED chips DT adjoining in the sub-scanning direction Df in the first lighting area RK1 is called as an interval k2. An interval between the LED chips DT adjoining in the main scanning direction Ds in the second lighting area RK2 is called as an interval k3, and an interval between the LED chips DT adjoining in the sub-scanning direction Df in the second lighting area RK2 is called as an interval k4. In this arrangement, the interval k3 is longer than the interval k1, and the interval k4 is longer than the interval k2. Each of the intervals k1-k4 may be a distance between centers of the adjoining LED chips DT.

Next, further to the components described above, as shown in FIG. 3, the printing apparatus 1 of the present embodiment includes motor driver ICs 30, 31, head driver ICs 32, 36, a conveyer motor 33, a carriage motor 34, lighting driver ICs 37, 38, an internal power source 15, and a power receiver 16.

The controller unit 19 has a CPU 20, storages including a ROM 21, a RAM 22, an EEPROM 23, an HDD 24, and an ASIC 25. The CPU 20 is a controlling device in the printing apparatus 1 and is connected with the storages. The CPU 20 may control the driver ICs 30-32, 36-38, and the display 5.

The CPU 20 may execute predetermined programs stored in the ROM 21 to implement various functions. The CPU 20 may be mounted in the controller unit 19 as a single processer or may include a plurality of processors that may cooperate with one another.

The ROM 21 may store a print-controlling program that may cause the CPU 20 to execute a printing process. The RAM 22 may store results of computation by the CPU 20. The EEPROM 23 may store information concerning initial settings input by a user. The HDD 24 may store specific information. The specific information may be confidential information that may not be leaked outside and may include, for example, information concerning users, job data including user IDs, which may be transmitted to the printing apparatus 1 from outside and may identify senders of the jobs, user use-history information including the user IDs contained in the job data, secure job data including data concerning passwords and secure jobs, print history, and cloud setting data. The information concerning users may include, for example, information concerning address book, information concerning email addresses, information concerning an administrator (security manager) of the printing apparatus 1, and information concerning network settings. The CPU 20 may, when the printing apparatus 1 receives the job data, store the user use-history information including the user ID contained in the job data in the HDD 24.

To the ASIC 25, the motor driver ICs 30, 31, the head driver ICs 32, 36, the lighting driver ICs 37, 38 are connected. The CPU 20 may receive a print job from the user and output a printing command to the ASIC 25 according to the print-controlling program. The ASIC 25 may activate the drivers ICs 30-32, 36-38 according to the printing command. The CPU 20 may drive the conveyer motor 33 through the motor driver IC 30 to move the platen 6 in the sub-scanning direction Df, and thereby, the printable medium W may be conveyed in the sub-scanning direction Df. The CPU 20 may drive the carriage motor 34 through the motor driver IC 31 to move the carriage 3 in the main scanning direction Ds. The CPU 20 may control the head driver ICs 32, 36 to discharge the inks through the discharging heads 10A, 10B mounted on the carriage 3 to print an image of image data on the printable medium W being conveyed. The CPU 20 may activate the lighting driver ICs 37, 38 to control the lighting units 40A, 40B to emit the UV light that may cure the inks.

The internal power source 15 is located at a predetermined position in the housing 2. The internal power source 15 enables the controller unit 19 to operate when a main power system of the printing apparatus 1 is off. The internal power source 15 may be, for example, a secondary battery. The power receiver 16 is arranged to be exposed outside the housing 2 to receive power from an external power source. When the main power system of the printing apparatus 1 is on, the power from the external power source may be supplied to the components in the printing apparatus 1 through the power receiver 16. Meanwhile, the power from the external power source may be supplied to the internal power source 15 through the power receiver 16 regardless of the on/off condition of the main power system, and the internal power source 15 may be charged with the power from the external power source.

Figure 4:
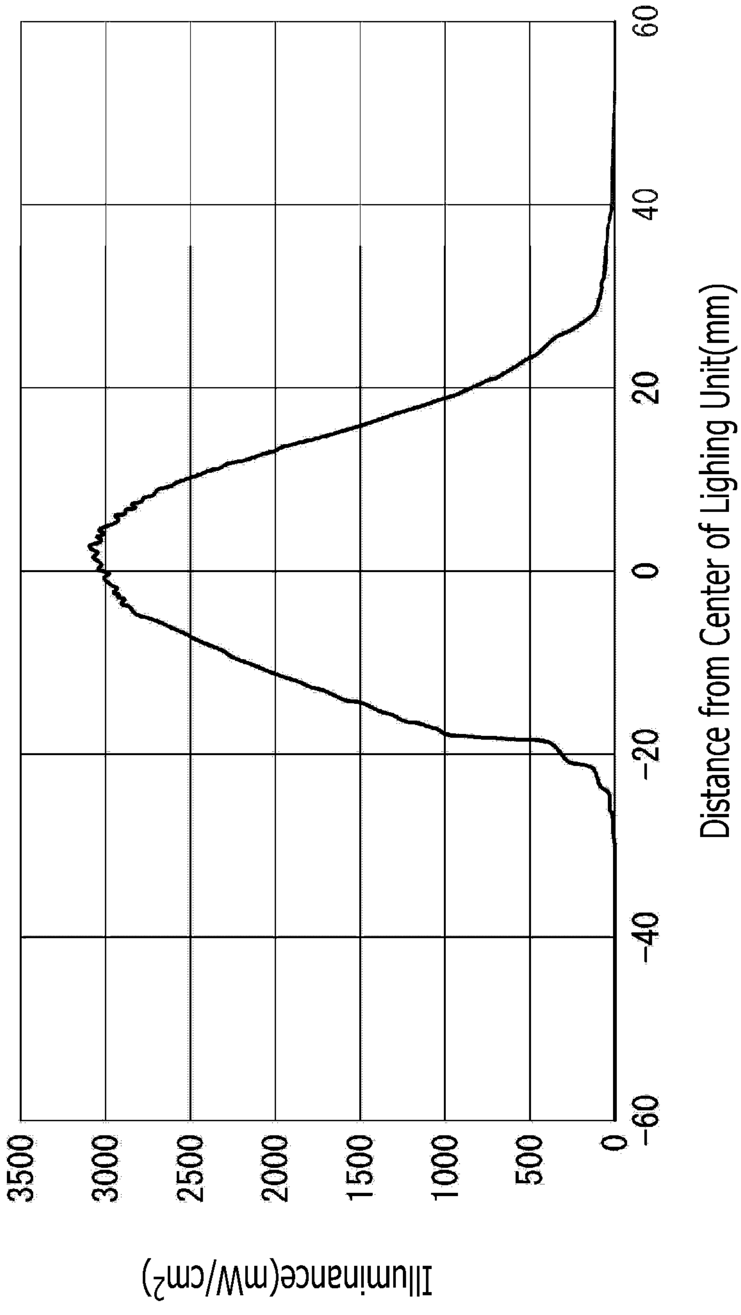
FIG. 4 is a graph to illustrate distribution of illuminance with reference to a center of the lighting unit in the printing apparatus according to the first embodiment of the present disclosure.

FIG. 4 shows a graph illustrating illuminance distribution in the main scanning direction Ds with reference to a center of the lighting unit 40A. In the present embodiment, as described above, the lighting unit 40A has the first lighting area RK1 and the second lighting area RK2 which is coarser than the first lighting area RK1 with regard to the quantity of the LED chips DT. In this arrangement, as shown in FIG. 4, a peak value of the illuminance is displaced rightward with respect to the center of the lighting unit 40A in the main scanning direction Ds. Therefore, compared to an arrangement, in which a peak value of illuminance is located at the center of the lighting unit 40A in the main scanning direction Ds, reflected light that may reach the nozzle surface of the discharging head 10A may be reduced.

Figure 5:
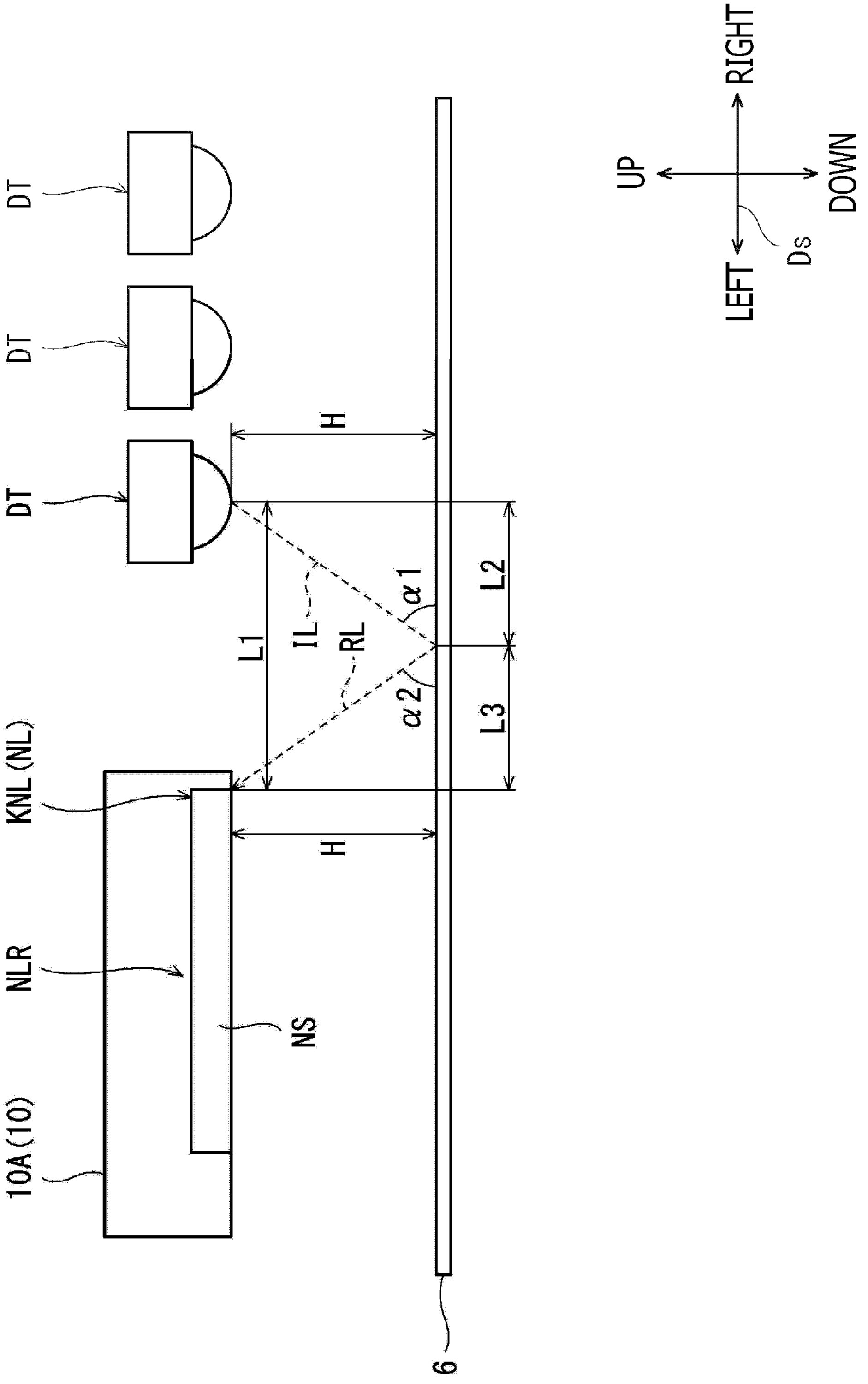
FIG. 5 is an illustrative view of a positional relation between a closest nozzle line in the discharging head and light-emitting diode (LED) chips in the printing apparatus according to the first embodiment of the present disclosure.

Next, a positional relation between the discharging head 10A and the LED chips DT in the lighting unit 40A will be described with reference to the drawings. FIG. 5 is an illustrative view of the positional relation between the closest nozzle line KNL in the discharging head 10A and the LED chips DT. A reference sign NLR in FIG. 5 denotes an entire range in which the four nozzle lines NL are arranged.

In FIG. 5, the closest nozzle line KNL in the discharging head 10A and a center of the LED chips DT located at the leftward end in the main scanning direction Ds are separated by a distance L1. The LED chips DT and the platen 6 are separated by a distance H, and a nozzle surface NS of the discharging head 10A and the platen 6 are separated by the distance H. In other words, in the example shown in FIG. 5, the nozzle surface NS of the discharging head 10A and the LED chips DT align on a same plane. Moreover, a vector concerning incident light IL emitted from each LED chip DT has a horizontal component (main scanning direction component) L2, and a vector concerning reflected light RL from the platen 6 has a horizontal component (main scanning direction component) L3. Furthermore, an incident angle of the incident light IL, i.e., an acute angle between the incident light IL and the platen 6, will be called as an incident angle $\alpha$1, and a reflection angle of the reflected light RL, i.e., an acute angle between the reflected light RL and the platen 6, will be called as a reflection angle $\alpha$2. In this embodiment, the reflection angle $\alpha$2 is equal to the incident angle $\alpha$1 in principle.

Based on the arrangement described above, the closest nozzle line KNL is irradiated with the reflected light RL when a formula $L2+L3\geq L1$, or $(H/\tan\alpha1)+(H/\tan\alpha2)\geq L1$, is satisfied. In this regard, for the incident angle $\alpha$1, an equation $\alpha1=\text{atan}(H/L2)$ is derived. Similarly, for the reflection angle $\alpha$2, an equation $\alpha2=\text{atan}(H/L3)$ is derived.

Meanwhile, in order to prevent the closest nozzle line KNL from being irradiated with the reflected light RL, one may consider the distance between the discharging head 10A and the LED chips DT may be increased as long as possible. However, with the increased distance between the discharging head 10A and the LED chips DT, a volume of the carriage 3 may be increased, or downsizing of the carriage 3 may be difficult. Generally, when the reflection angle $\alpha$2 is smaller than 20 degrees, illuminance may be reduced by approximately 60-70%. In this regard, when the discharging head 10A and the LED chips DT are in a positional relation such that the closest nozzle line KNL is irradiated with the reflected light RL, of which reflection angle $\alpha$2 is 20 degrees or more, in other words, when the discharging head 10A and the LED chips DT are in a positional relation that satisfies the formula $(H/\tan 20°)+(H/\tan 20°)\geq L1$, providing the second lighting area RK2 in the lighting unit 40A may be suggested as a standard treatment to reduce the reflected light RL that may reach the closest nozzle line KNL.

Next, a positional relation between the closest nozzle line KNL in the discharging head 10A and the LED chips DT, when the LED chips DT are located at a position higher than the nozzle surface NS, will be described. In the description below with reference to FIG. 6, parameters that are identical to those described above with reference to FIG. 5 are omitted.

When the LED chips DT are located to be higher than the nozzle surface NS, arrangement of the closest nozzle line KNL in the discharging head 10A and the LED chips DT is substantially similar to the arrangement as described above with reference to FIG. 5. That is, when the formula $L2+L3\geq L1$, or $(H/\tan\alpha1)+(H/\tan\alpha2)\geq L1$, is satisfied, the closest nozzle line KNL is irradiated with the reflected light RL. In this regard, for the incident angle $\alpha$1, an equation $\alpha 1$=atan (H'/L2) is derived. Similarly, for the reflection angle $\alpha 2$, an equation $\alpha 2$=atan (H/L3) is derived.

Figure 6:
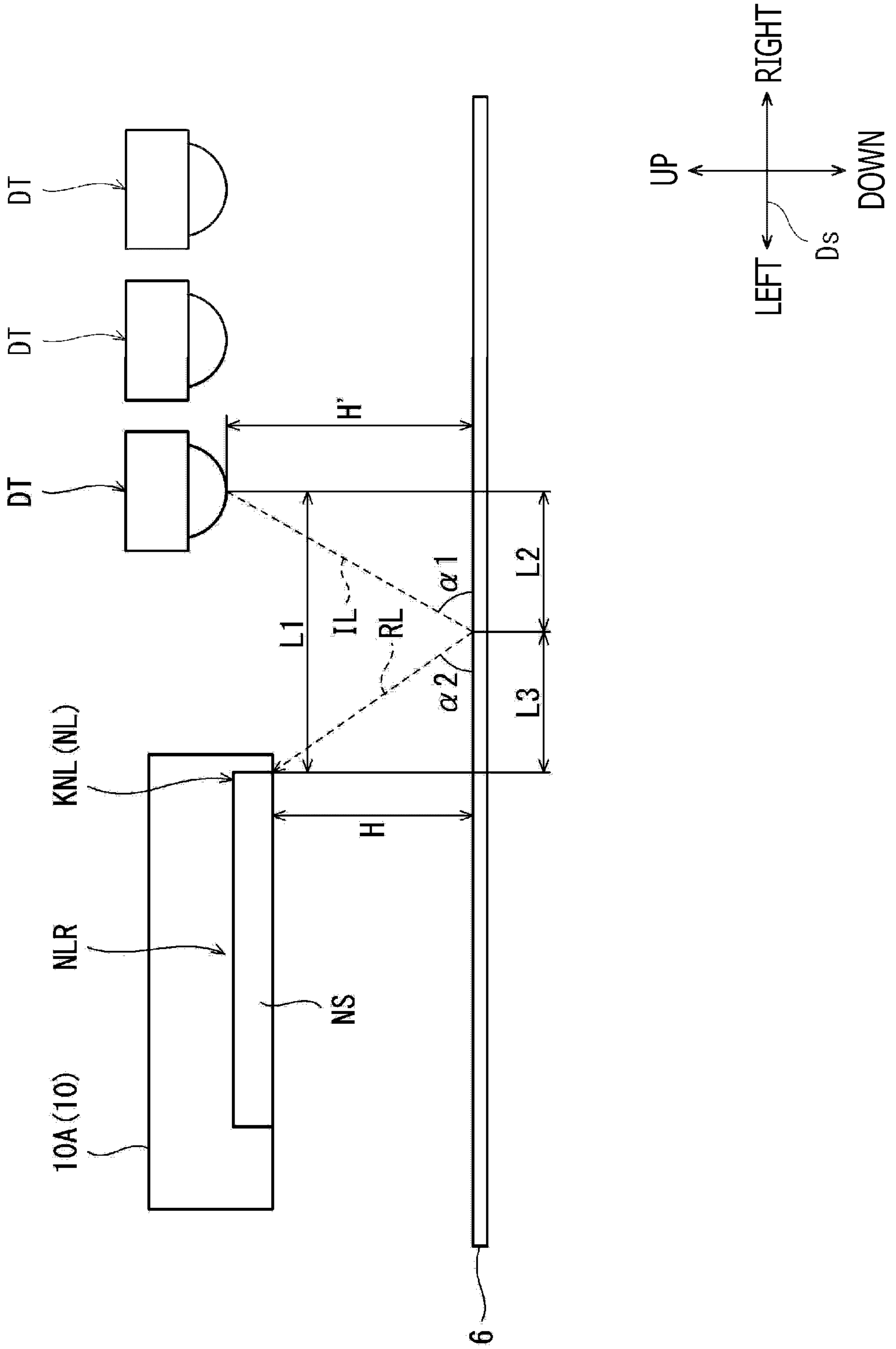
FIG. 6 is an illustrative view of another positional relation between the closest nozzle line in the discharging head and the LED chips in the printing apparatus according to the first embodiment of the present disclosure.

In the arrangement shown in FIG. 6, similarly to the arrangement shown in FIG. 5, based on the observation that the illuminance may be reduced by approximately 70% when the reflection angle $\alpha 2$ is smaller than 20 degrees, when the discharging head 10A and the LED chips DT are in the positional relation such that the closest nozzle line KNL is irradiated with the reflected light RL, of which reflection angle $\alpha 2$ is 20 degrees or more, providing the second lighting area RK2 in the lighting unit 40A may be suggested as a standard treatment to reduce the reflected light RL that may reach the closest nozzle line KNL.

As described above, in the printing apparatus 1 according to the present embodiment, the second lighting area RK2, in which the quantity of LED chips DT per unit area is smaller than the quantity of LED chips DT per unit area in the first lighting area RK1, is provided at the position closer to the discharging head 10A in the main scanning direction Ds. Therefore, rather than distributing the illuminance evenly in the main scanning direction Ds, a coarse-dense area, consisting of a coarse area and a dense area of the illuminance, may be formed. In this arrangement, the area closer to the discharging head 10A in the main scanning direction Ds may be provided as the coarse area, and the area farther from the discharging head 10A in the main scanning direction Ds may be provided as the dense area. Accordingly, a maximum value, i.e., an illuminance peak, in the illuminance distribution may be located at a position farther than the center of the lighting unit 40A from the discharging head 10A in the main scanning direction Ds. Therefore, the reflected light RL that may reach the nozzle surface NS of the discharging head 10A may be reduced. Thus, the inks in the nozzle holes may be restrained or prevented from being cured by the reflected light RL, and incorrect discharging of the inks from the discharging head 10A may be prevented. Moreover, by providing the coarse area of the illuminance, transition of the illuminance in the illuminance distribution in the conveying direction of the printable medium W, i.e., the sub-scanning direction Df, may be moderated; therefore, when printing in a gloss ink, e.g., the clear ink to form an overcoat layer, the discharged gloss ink may not form streaks on the printable medium W easily. Meanwhile, by providing the dense area of the illuminance, the illuminance to substantially cure the inks discharged from the discharging head 10A may be reserved. Thus, without increasing dimensions of the carriage 3, deficiency in discharging the inks may be prevented while curability of the inks may be substantially secured.

According to the present embodiment, the direct distance LT1 is the minimum distance between the closest nozzle line KNL and the first lighting area RK1, and the direct distance LT2 is the minimum distance between the closest nozzle line KNL and the second lighting area RK2. In this arrangement, the positional relation between the first lighting area RK1 and the second lighting area RK2 may be defined with reference to the closest nozzle line KNL, which may be irradiated with the reflected light RL most intensely.

According to the present embodiment, the configuration to move the printable medium W and the discharging head 10A relatively is accomplished by the carriage 3 in the known configuration. Therefore, the discharging head 10A may be controlled to move relatively to the printable medium W in the known method easily.

According to the present embodiment, the interval k3 between the adjoining LED chips DT in the second lighting area RK2 in the main scanning direction Ds is longer than the interval k1 between the adjoining LED chips D in the first lighting area RK1T in the main scanning direction Ds, and the interval k4 between the adjoining LED chips DT in the second lighting area RK2 in the sub-scanning direction Df is longer than the interval k2 between the adjoining LED chips DT in the first lighting area RK1 in the sub-scanning direction Df, Thus, the coarse area for the LED chips DT may be formed easily in the second lighting area RK2, and the dense area for the LED chips DT may be formed easily in the first lighting area RK1.

Second Embodiment

Figure 7:
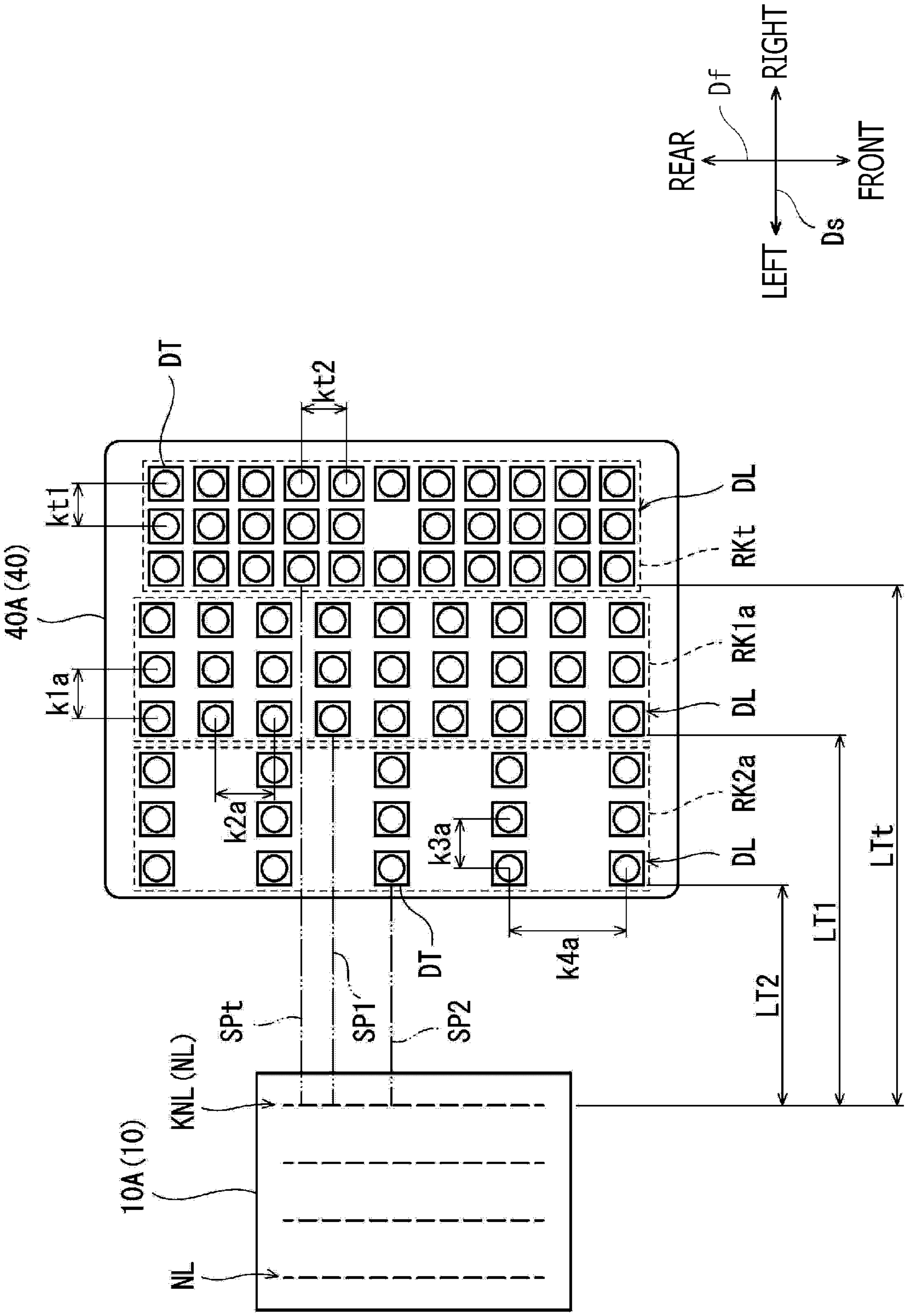
FIG. 7 is an illustrative view of a discharging head and a lighting unit of the printing apparatus according to a second embodiment of the present disclosure.

Next, a second embodiment of the present disclosure will be described. The second embodiment is different from the first embodiment in that the lighting unit 40A has a third lighting area RKt additionally to a first lighting area RK1*a* and a second lighting area RK2*a*, which will be described below. FIG. 7 is an illustrative view of the discharging head 10A and the lighting unit 40A according to the second embodiment of the present disclosure.

As shown in FIG. 7, in the first lighting area RK1*a* and the second lighting area RK2*a* in the lighting unit 40A, the LED chips DT are arranged in matrixes. Moreover, in the lighting unit 40A, the third lighting area RKt, of which direct distance LTt from the discharging head 10A is longer than the direct distance LT1 between the first lighting area RK1*a* and the discharging head 10A. In other words, the third lighting area RKt is located rightward with respect to the first lighting area RK1*a*. The direct distance LTt is a distance from the closest nozzle line KNL and a leftward end of the LED chips DT closest to the discharging head 10A among the LED chips DT in the third lighting area RKt in the main scanning direction. In the present embodiment, the direct distance LTt is equal to a minimum distance from the closest nozzle line KNL to the leftward end of the LED chips DT in the third lighting area RKt and is therefore relevant to a space SPt between the closest nozzle line KNL and the leftward end of the LED chips DT in the third lighting area RKt. Optionally, in order to restrain a temperature of the LED chips DT from increasing, a center of the third lighting area RKt may be left blank without arranging the LED chip DT.

A quantity of LED chips DT per unit area in the third lighting area RKt is smaller than a quantity of LED chips DT per unit area in the first lighting area RK1*a* and than a quantity of LED chips DT per unit area in the second lighting area RK2*a*. In other words, the third lighting area RKt is coarser than the first lighting area RK1*a* and than the second lighting area RX2*a* with regard to the quantity of LED chips DT, and the first lighting area RK1 and the second lighting area RK2 are denser than the third lighting area RKt with regard to the quantity of LED chips DT.

Intervals between the LED chips DT in the first lighting area RK1*a*, the second lighting area RK2*a*, and the third lighting area RKt will be herein described. The LED chips DT in the first lighting area RK1*a*, the second lighting area RK2*a*, and the third lighting area RKt are in an arrangement such that intervals between adjoining LED chips DT in the third lighting area RKt in at least one of the main scanning direction Ds and the sub-scanning direction Df are longer than intervals between adjoining LED chips DT in the first lighting area RK1*a* and in the second lighting area RK2*a* in at least one of the main scanning direction Ds and the sub-scanning direction Df.

In particular, in the present embodiment, an interval between LED chips DT adjoining in the main scanning direction Ds in the first lighting area RK1*a* is called as an interval k1*a*, and an interval between the LED chips DT adjoining in the sub-scanning direction Df in the first lighting area RK1*a* is called as an interval k2*a*. An interval between LED chips DT adjoining in the main scanning direction Ds in the second lighting area RK2*a* is called as an interval k3*a*, and an interval between the LED chips DT adjoining in the sub-scanning direction Df in the second lighting area RK2*a* is called as an interval k4*a*. Moreover, an interval between the LED chips DT adjoining in the main scanning direction Ds in the third lighting area RKt is called as an interval kt1, and an interval between the LED chips DT adjoining in the sub-scanning direction Df in the third lighting area RKt is called as an interval kt2, In this arrangement, the interval k1*a* is shorter than the interval k3*a*, and the interval k2*a* is shorter than the interval k4*a*. The interval kt1 is shorter than the interval k1*a*, and the interval kt2 is shorter than the interval k2*a*.

According to the second embodiment, the benefits achievable through the first embodiment may be similarly achieved. That is, the reflected light RL that may reach the nozzle surface NS of the discharging head 10A may be reduced. Therefore, the inks in the nozzle holes may be restrained or prevented from being cured by the reflected light RL, and incorrect discharging of the inks from the discharging head 10A may be prevented. Moreover, by providing the coarser area of the illuminance, transition of the illuminance in the illuminance distribution in the conveying direction of the printable medium W, i.e., the sub-scanning direction Df, may be moderated; therefore, when printing in a gloss ink, e.g., the clear ink to form an overcoat layer, the discharged gloss ink may not form streaks on the printable medium W easily. Meanwhile, by providing the dense area of the illuminance, the illuminance to substantially cure the inks discharged from the discharging head 10A may be reserved. Thus, without increasing the dimensions of the carriage 3, deficiency in discharging the inks may be prevented while curability of the inks may be substantially secured.

More Examples

Although examples of carrying out the invention have been described, those skilled in the art will appreciate that there are numerous variations and permutations of the printing apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

For example, a quantity of the lighting areas to be provided in the lighting unit 40A may not necessarily be limited to two, e.g., the first lighting area RK1 and the second lighting area RK2, or three, e.g., the first lighting area RK1*a*, the second lighting area RK2*a*, and the third lighting area RKt, but may be four or more. When four or more lighting areas are provided, the longer the direct distance from the closest nozzle line KNL in the discharging head 10A to the lighting area is, the larger the quantity of the LED chips DT in the lighting area is increased.

For another example, the interval k3 between the LED chips DT adjoining in the main scanning direction Ds in the second lighting area RK2 may not necessarily be longer than the interval k1 between the LED chips DT adjoining in the main scanning direction Ds in the first lighting area RK1, or the interval k4 between the LED chips DT adjoining in the sub-scanning direction Df in the second lighting area RK2 may not necessarily be longer than the interval k2 between the LED chips DT adjoining in the sub-scanning direction Df in the first lighting area RK1, as long as at least one of the interval k3 in the main scanning direction and the interval k4 in the sub-scanning direction Df in the second lighting area RK2 is longer than the interval k1 in the main scanning direction Ds and the interval k2 in the sub-scanning direction Df in the first lighting area RKL.

For another example, in order to form the coarse area and the dense area of the LED chips DT in the lighting unit 40A, the LED chips DT may not necessarily be arranged at the even intervals in the main scanning direction Ds and the sub-scanning direction Df but may be arranged at uneven intervals.

For another example, the discharging head 10 may not necessarily include two (2) discharging heads 10A, 10B but may have a single discharging head 10 alone, and the lighting unit 40 may not necessarily include two (2) lighting units 40A, 40B but may have a single lighting unit 40 alone,

What is claimed is:

1. A printing apparatus, comprising:

a discharging head configured to discharge ultraviolet-curable ink at a printable medium;

a relative movable assembly configured to move the printable medium and the discharging head relatively in a predetermined direction when the discharging head discharges the ink at the printable medium; and a lighting unit including a plurality of light sources configured to emit light for curing the ink, the plurality of light sources including a part of the plurality of light sources and another part of the plurality of light sources, wherein:

the part of the plurality of light sources is arranged in a first lighting area, the another part of the plurality of light sources is arranged in a second lighting area, a quantity of the light sources per unit area in the second lighting area is smaller than a quantity of the light sources per unit area in the first lighting area, and a direct distance from the discharging head to the second lighting area in a direction parallel to the predetermined direction is shorter than a direct distance from the discharging head to the first lighting area in the direction parallel to the predetermined direction.

2. The printing apparatus according to claim 1, wherein the first lighting area and the second lighting area are arranged side by side along the predetermined direction.

3. The printing apparatus according to claim 1, wherein the discharging head includes a plurality of nozzle lines aligning along an intersecting direction that intersects with the predetermined direction, each of the plurality of nozzle lines having a plurality of nozzles, the plurality of nozzle lines including a closest nozzle line located to be closest to the lighting unit among the plurality of nozzle lines, and wherein the direct distances are minimum distances from the closest nozzle line to the first lighting area and the second lighting area.

4. The printing apparatus according to claim 1, wherein the relative movable assembly includes a carriage, on which the discharging head is mounted, the carriage being movable in the predetermined direction.

5. The printing apparatus according to claim 1, wherein the light sources in each of the first lighting area and the second lighting area are arranged in a matrix, and wherein an interval between the light sources in the second lighting area adjoining in at least one of the predetermined direction and an intersecting direction that intersects with the predetermined direction is longer than an interval between the light sources in the first lighting area adjoining in the at least one of the predetermined direction and the intersecting direction.

6. The printing apparatus according to claim 1, wherein the plurality of light sources include further another part of the plurality of light sources, wherein the further another part of the plurality of light sources is arranged in a third lighting area, and wherein a quantity of the light sources per unit area in the third lighting area is greater than the quantity of the light sources per unit area in the first lighting area and greater than the quantity of the light sources per unit area in the second lighting area.

* * * * *